(12) United States Patent
Klingelhage et al.

(10) Patent No.: US 8,263,184 B2
(45) Date of Patent: Sep. 11, 2012

(54) PROCESS FOR THE PRODUCTION OF AN UNDERLAY FOR ROOFS

(75) Inventors: Norbert Klingelhage, Wetter (DE); Rüdiger Laur, Dortmund (DE); Jörn Schröer, Herdecke (DE)

(73) Assignee: Ewald Doerken AG, Herdecke (DE)

( * ) Notice: Subject to any disclaimer, the term of this patent is extended or adjusted under 35 U.S.C. 154(b) by 1062 days.

(21) Appl. No.: 10/583,787

(22) PCT Filed: Dec. 14, 2004

(86) PCT No.: PCT/EP2004/014233
§ 371 (c)(1),
(2), (4) Date: Jun. 19, 2006

(87) PCT Pub. No.: WO2005/058599
PCT Pub. Date: Jun. 30, 2005

(65) Prior Publication Data
US 2008/0227353 A1    Sep. 18, 2008

(30) Foreign Application Priority Data
Dec. 18, 2003 (DE) .................................. 103 59 957

(51) Int. Cl.
*B05D 1/26* (2006.01)
*B05D 3/12* (2006.01)

(52) U.S. Cl. ...................... 427/365; 427/366; 427/412.1; 427/412.3

(58) Field of Classification Search .................. 427/314, 427/316, 355, 359, 365, 366, 369, 370, 371, 427/407.1, 412.1, 412.3
See application file for complete search history.

(56) References Cited

U.S. PATENT DOCUMENTS

| | | | |
|---|---|---|---|
| 6,677,258 B2 * | 1/2004 | Carroll et al. | 442/394 |
| 2003/0077964 A1 * | 4/2003 | Klein | 442/149 |
| 2005/0097857 A1 * | 5/2005 | Mehta et al. | 52/782.1 |
| 2005/0227086 A1 * | 10/2005 | Murphy | 428/423.1 |

FOREIGN PATENT DOCUMENTS

| | | |
|---|---|---|
| DE | 4428304 A1 | 2/1996 |
| DE | 19504017 A1 | 8/1996 |
| DE | 19642253 A1 | 8/1997 |
| DE | 29801953 U1 | 6/1998 |
| DE | 29811128 U1 | 10/1998 |
| DE | 19725451 A1 | 12/1998 |
| DE | 19908465 A1 | 9/1999 |
| DE | 10133822 A1 | 2/2003 |
| EP | 0 700 779 A2 * | 3/1996 |
| EP | 0700779 A2 | 3/1996 |
| WO | WO 96/37668 A1 | 11/1996 |

OTHER PUBLICATIONS

International Preliminary Examination Report for PCT/EP2004/014233, Aug. 19, 2006, 6 pages.*

* cited by examiner

*Primary Examiner* — William Phillip Fletcher, III
(74) *Attorney, Agent, or Firm* — Bachman & LaPointe, P.C.

(57) ABSTRACT

A method is provided for the production of an active-breathing composite in the form of a web, consisting of a nonwoven made of synthetic material and a layer fully or mainly consisting of polyurethane for utilization as counter ceiling webs for roofs and as facade webs. PU or a mixture of materials with a high fraction of PU is heated to melting temperature and extruded on a nonwoven made of PP in order to form a diffusion-open coating of the PP nonwoven and then pressing the PP nonwoven in order to form an active-breathing composite.

15 Claims, 2 Drawing Sheets

PROCESS FOR THE PRODUCTION OF AN UNDERLAY FOR ROOFS

Figure 1:
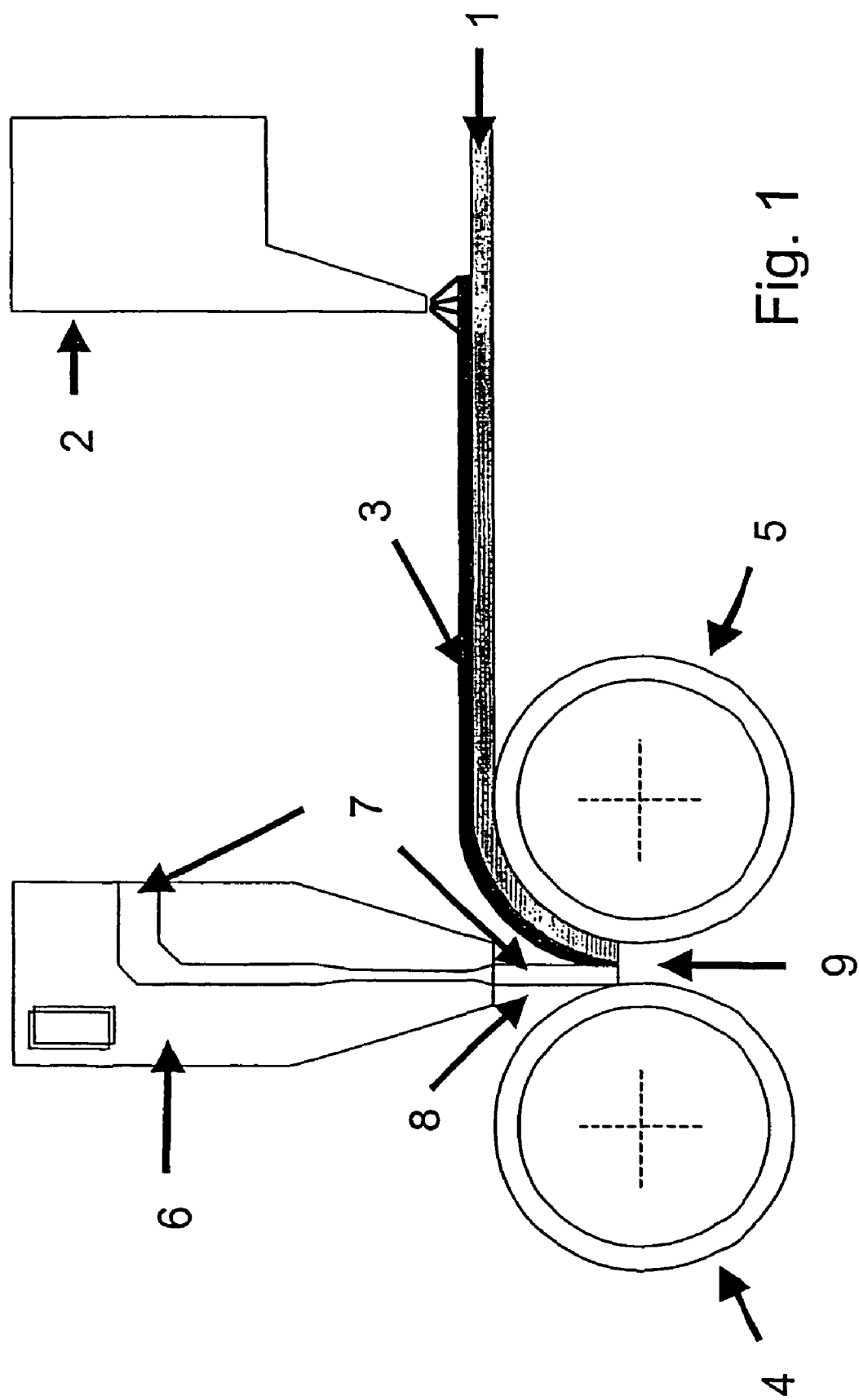

The invention relates to a process for the production of an actively-breathing composite in the form of a web consisting of a nonwoven made of synthetic material and a layer consisting entirely or mainly of polyurethane (PU) for utilisation as an underlay for roofs and as a faqade web. The invention further relates to such a web.

A process for the production of an actively-breathing double-layered composite in the form of a web consisting of a nonwoven polyester is already known for utilisation as an underlay for roofs. The roof underlay is so arranged below the roof covering of a roof that the PU foil is directed outwardly and the nonwoven inwardly. The PU foil is resistant to wind and solid matter and is waterproof, but water vapour permeable. The nonwoven serves primarily as the carrier for the PU foil and, moreover, can assume the function of a water vapour storage means in times of high water vapour accumulation. When producing the roof underlay, the PU layer is applied to the nonwoven by extrusion of PU or as a dispersion and joined to the nonwoven in a bonded manner as well as without bonding aids. Nonwoven polyesters are relatively expensive, so that, as a result, high costs are incurred in the production of a roof underlay consisting of a PU-coated nonwoven polyester.

It is, therefore, an object of the invention to produce an actively-breathing composite in the form of a web consisting of a nonwoven made of synthetic material and a layer consisting entirely or mainly of PU, suitable to be used as a roof underlay, i.e. being resistant to solid matter, wind and water as well as being water vapour permeable and sufficiently resistant to tearing when being processed as a roof underlay, and permitting to lower costs in relation to a composite consisting of a nonwoven polyester and a PU layer. This object also applies to a corresponding roof underlay which should be producible at costs lower than those incurred to date and without impairing the aforesaid properties.

Starting from a process of the type mentioned in the opening paragraph, the object of the invention is attained in that PU or a mixture of materials having a high PU content referred to in the following as PU product or PU layer is heated to melting temperature and is extruded onto a nonwoven consisting of polypropylene (PP) in order to form a diffusion-permeable coating of the PP nonwoven as well as pressed to the PP nonwoven to form an actively-breathing composite.

If, in this manner, a PU product is heated and extruded onto a web-like PP nonwoven and pressed to the latter, a roof underlay is brought about which can be produced very economically, comprising the above mentioned properties. Nonwoven PP material does not only have a very clear cost advantage in comparison with the above mentioned nonwoven materials—at least in relation to those having equivalent carrier properties—, but also exhibits good resistance to media such as alkalis with no capillary water transport taking place. Due to the fact that, in addition, a PU product serves to coat the PP nonwoven, all properties important for the function of the roof underlay, to which intrinsically flame retardant properties also pertain, are preserved, the process according to the invention being characterised by high economic efficiency. Coatings and/or films consisting of other raw materials on PP carriers, such as, for example a TPEE film or a PEBA film, each on a PP nonwoven, form a composite which is inferior to a composite comprising a PU layer, i.e. they tend, in particular, to swell and, as a result, to separate the coating when employed outdoors. Moreover, these materials are also more expensive than PU, thus do not permit an economical production of an actively-breathing composite.

It is advantageous for the PU product to be extruded onto the PP nonwoven immediately in the region where the PU layer is pressed to the PP nonwoven. In this manner, the extruded PU is bonded particularly firmly to the PP nonwoven.

It is also advantageous to preheat the PP nonwoven, as a result of which the prerequisites for the bonding between the preferably calendered PP nonwoven and the PU to be extruded thereon, are improved even further.

In order to increase the adhesion of the PU product to the PP nonwoven very substantially, a bonding agent between the PU product and the PP nonwoven may be used during the production of the composite. Various possibilities, as will become clear in the following, exist for the use of a bonding agent in order to prevent any possible separation of the PU layer from the PP nonwoven.

The PP nonwoven is ideally provided with the bonding agent prior to applying the PU layer, i.e. when feeding the PP nonwoven to the region in which pressing of the PU layer to the PP nonwoven is performed.

Applying the bonding agent is performed advantageously in such a manner that the bonding agent is applied to, in particular sprayed onto the PP nonwoven immediately prior to pressing the PU layer onto the PP nonwoven. This effects a concentration of the process measures in the region of pressing the two layers to one another, and the bonding agent, preferably applied to the PP nonwoven by spraying, enters between the PU layer and the PP nonwoven immediately upon application onto the PP nonwoven without undesirable changes or impairments of the sprayed-on bonding agent.

Preferably, a reactive hot-melt is applied onto the PP nonwoven as a bonding agent, in particular spot-wise for bringing about a structure of alternatingly wetted and clear regions. In particular, by spraying the bonding agent onto the PP nonwoven, such a structure can be readily brought about on the surface of the PP nonwoven, in order to prevent any reduction of the diffusibility of the composite due to a continuous, impermeable bonding agent layer.

A particularly intimate adhesion between the PU layer and the PP nonwoven comes about if a reactive, PU-based hot-melt of the type JOWATHERMBREAKTANT 601.88 is so applied to the PP nonwoven as a bonding agent that it has not yet cooled down when coming into contact with the extruded PU product. This makes it possible to attain an adhesion between the PU layer and PP nonwoven which, during peeling tests, results in a delamination in the plane of the PP nonwoven, but not in the plane between the PU layer and the PP nonwoven.

An acrylate dispersion, e.g. Acronal S312D supplied by BASF or a bonding agent of the type Jowatherm Reaktant POR-Hotmelt may also be used as a bonding agent.

It is furthermore advantageous if the PP nonwoven and the extruded PU product are pressed to one another continuously in the gap between two press rolls, in particular that of a casting roll and a pressing roll. In particular, if, as already set out above, the extrusion of the PU product onto the PP nonwoven is performed directly in the region of pressing the two layers to one another, it is advantageous to perform the coating of the PP nonwoven with the extruded PU product in the roll gap, i.e. immediately before the PP nonwoven just coated with the extruded PU product is seized by the two press rolls.

At least one of the two press rolls should be heated, so that pressing of the PP nonwoven to the PU product extruded thereon is performed without any drop in temperature, but rather under the effect of heat.

As an alternative to applying the bonding agent to the PP nonwoven, it is also possible that the bonding agent is mixed with the PU and a PU bonding agent blend is extruded onto the PP nonwoven as the PU product. In this case, the separate application, e.g. spraying on of the bonding agent is dispensed with. Instead, a mixture suitable for the desired adhesion between the PU product and the PP nonwoven is produced between the PU material and the bonding agent, so that the PU product already comprises the desired bonding and adhesive properties during extrusion onto the PP nonwoven.

For the production embodiment comprising the joint application of a PU product and a bonding agent, for example a mixture of PU and maleic anhydride-modified polyolefin (e.g. EXXELORB VA 1801 manufactured by Exxon) may be melted on and extruded into the region, in which pressing between the PU product and the PP nonwoven is performed. The PU product may in this context consist of approx. 80 wt. O/O polyurethane (in particular DESMOPANB KU-2 8659 made by Bayer) and approx. 20 wt. % maleic anhydride-modified polyolefin (in particular EXXELORB VA 1801 made by Exxon). In this case as well, a very strong bonding between the PP nonwoven and the PU coating is created, so that the two layers cannot be separated from one another, without a separation in the plane of the PP nonwoven coming about.

A further method of using a bonding agent for further developing the process according to the invention resides in that the PP nonwoven is provided with the bonding agent in the molten state. For this, a maleic anhydridemodified polyolefin (in particular EXXELORa VA 1801 supplied by Exxon) is suited to serve as bonding agent. In this case, not only the surface of the PP nonwoven is available for bonding to the PU product, but the bonding agent may also act on those parts of the PU product which penetrate the nonwoven structure while pressing the PU layer to the PP nonwoven.

According to a further development of the process according to the invention, it is also possible for the extrusion of the PU product to take place while simultaneously applying the bonding agent to the PP nonwoven. Depending on the type of bonding agent used, the extrusion of the PU product onto the PP nonwoven may be performed in one squirt by the spraying jet of the bonding agent or in immediate succession.

It is likewise possible to co-extrude the PU product and the bonding agent during application. In this case,—the bonding agent is supposed to reach the PP nonwoven before it reaches the PU product, so that the bonding agent faces the PP nonwoven.

Regardless of which process is selected for applying the PU product as well as possibly also a bonding agent, it is advantageous if DESMOPANB KU-2 8659 of the company Bayer is used as PU.

It is possible to provide the PU and also the PP nonwoven with additives such as, for example, colours, pigments, stabilisers and flame retarding agents.

It is also possible to produce the actively-breathing composite in the form of a web from three or even more layers, in particular as a PU intermediate layer with nonwovens made of PP on both sides of the PU layer.

Further advantageous measures for bringing about a strong bonding between the PP nonwoven and the PU product or the PU layer, respectively, reside in a pretreatment of the PP nonwoven by fluorinating, corona, plasma, CVD, PVD and/or wetting agents. Monomers or oligomers based on acrylic acid, acrylic acid ester, maleic anhydride and vinyl acetate are suitable for using CVD. Metal oxides, for example, are suitable for the use of PVD. Surfactants with the highest possible molecularity are used as wetting agents.

A roof underlay and a faqade web by means of which the above stated object of the invention is attained, exhibits the characteristic according to the invention that a nonwoven material made of PP and a layer extruded onto the nonwoven material made of PP consisting of PU or a mixture of materials with a high fraction of PU—hereafter referred to as PU layer—are pressed together to form an actively-breathing composite.

Because of the PU layer, such a roof underlay is resistant to solid matter and wind, and is waterproof, but is water vapour permeable. The good properties of the PP nonwoven as the carrier of the PU layer confer to the composite according to the invention all desired properties of an underlay for roofs, without, however, incurring high costs such as did the other nonwoven materials used in conjunction with PU layers for roof underlays. As for the remainder, reference is made expressly to the characteristics and advantages mentioned above in connection with the description and explanation of the process according to the invention. It is thus possible that the PU and also the PP nonwoven in the composite according to the invention are provided with additives, such as, for example, colours, pigments, stabilisers and flame retardants. The counter ceiling web may also consist of three layers, namely of a PU intermediate layer with nonwovens made of PP on both sides of the PU layer.

It is advantageous if the composite of the PU layer and the PP nonwoven comprises a bonding agent. The bonding agent—in particular a reactive PU-based hot-melt (in particular JOWATHERMB REAKTANT 601.88) should in this context be provided in the composite between the PP nonwoven and the PU layer. The alternatives stated above in connection with the process according to the invention, are likewise to be considered as advantageous further developments for or alternatives to advantageous embodiments of the roof underlay according to the invention.

Figure 2:
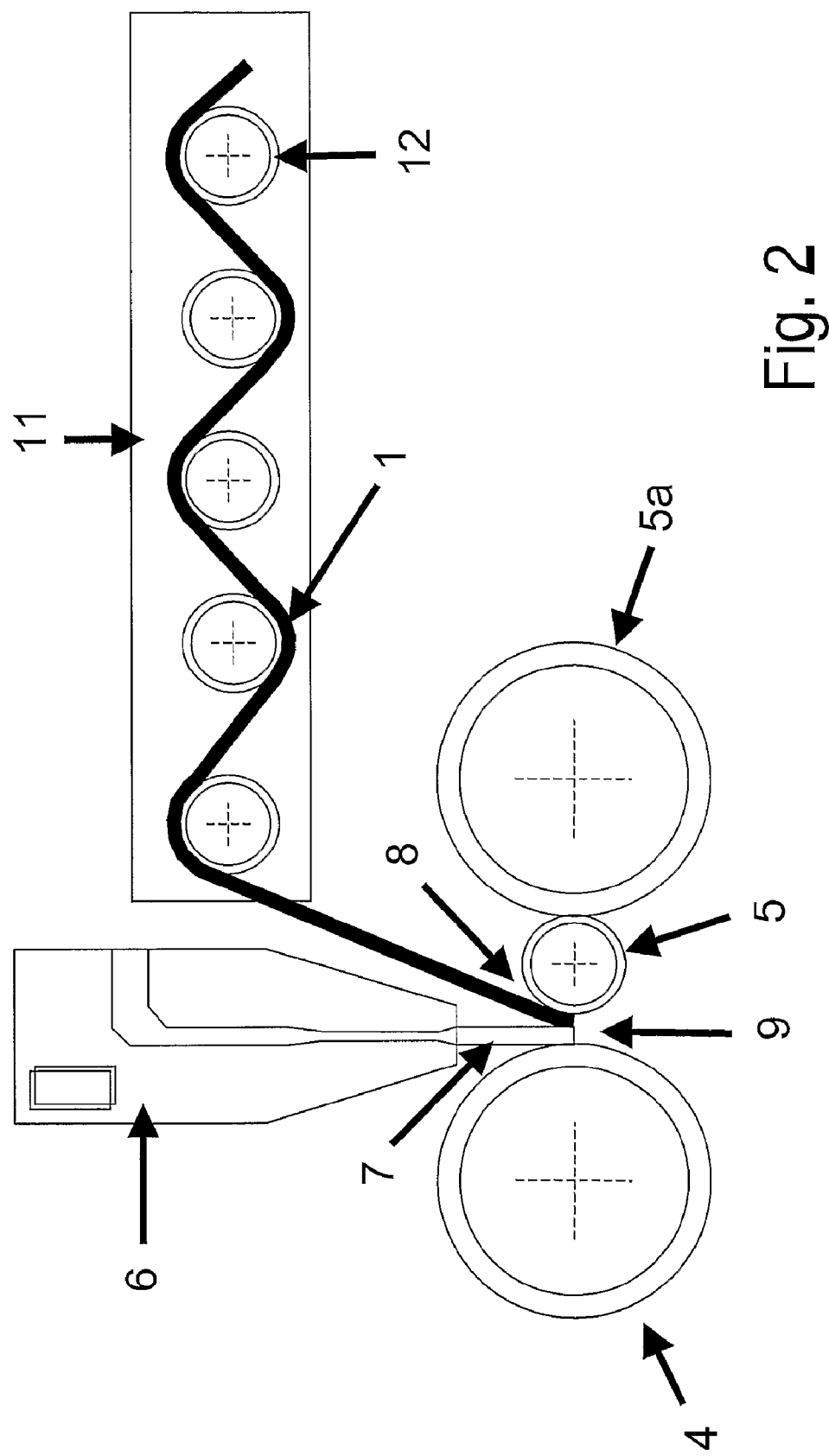

Embodiments of the invention are elucidated in detail in what follows with reference to the drawings. There is shown in:

FIG. 1 a schematic view of the production of an actively-breathing composite in the form of a web consisting of a PP nonwoven, coated with a bonding agent, and a PU layer;

FIG. 2 a schematic view of the production of an actively-breathing composite in the form of a web made of a PP nonwoven and a layer consisting of a PU bonding agent blend.

In the first embodiment, shown in FIG. 1, a continuous, web-like as well as calendered PP nonwoven 1 is fed via a pressing roll 5 to a pair of rolls consisting of a casting roll 4 and a pressing roll 5. Before the PP nonwoven 1 reaches the roll gap 8, a bonding agent 3, preferably a reactive PU-based hot-melt of the type JOWATHERMB REAKTANT 601.88 is sprayed onto the exposed surface of the PP nonwoven 1 by a spraying head 2 in the manner shown schematically in the drawing.

From a nozzle 6 a molten PU product 7, preferably polyurethane of the type DESMOPANB KU-2 8659 supplied by the company Bayer, is sprayed in the roll gap 8 onto the PP nonwoven 1 provided with the bonding agent 3, immediately ahead of the region, where the PP nonwoven 1 comprising the bonding agent 3 and the PU product 7 is pressed continuously to form a solid composite 9.

In this preferred embodiment, the PU product 7 having a weight per surface area of 70 g/m2 is extruded onto a calendered PP nonwoven 1 having a weight per surface area of 70 g/m2. In this context, the weight per surface area of the bonding agent 3 of the aforesaid type is 5 glm2. Departures from the aforesaid parameters are possible, depending on the requirements for the final product.

In general, it may be said that—depending on requirements in a specific case—weights per surface area in the range of 10-150 g/m2, more specifically in the range of 20-1 20 g/m2, in particular, however, in the range of 30-100 g/m2 may be selected for the PU layer. Possible weights per surface area for the PP nonwoven 1—likewise depending on requirements in a specific case—are in the range of 20-300 g/m2, preferably in the range of 40-200 g/m2 and particularly in the range of 60-150 g/m2. For the bonding agent corresponding ranges of the weights per surface area apply, i.e, in principle 1-30 g/m2, in general, however, in the range of 2-20 g/m2 and particularly in the range of 3-10 g/m2.

The weight proportion of the bonding agent—with reference to the embodiment according to FIG. 1—is in the range of 2-200/0, preferably in the range of 5-10%.

The proportion of the bonding agent in the PU product 7 may in this case be 2-30 wt.-Ole, in particular 5-20 wt.-% (embodiment according to FIG. 2).

It is advantageous if the bonding agent 3 is applied as closely to the roll gap 8 as possible, so that it does not cool down before the PU product 7 is extruded on and the PP nonwoven 1 is pressed to the PU product 7 between the casting roll 4 and the pressing roll 5. A peeling test after storage of the composite 9 24 hours after pressing resulted in a delamination in a plane of the PP nonwoven 1.

In the alternative embodiment shown schematically in FIG. 2, the PP nonwoven 1 passes through a preheating system 11, comprising heating rolls 12, before the PP nonwoven 1 is drawn into the roll gap 8 between the casting roll 4 and the pressing roll 5, heated in the present case. The pressing roll 5 is supported by a supporting roll 5a.

From the nozzle 6 a PU bonding agent blend, serving as the PU product 7, namely a molten mixture of PU and a bonding agent, is extruded in the roll gap 8 between the casting roll 4 and the pressing roll 5, so that the PU product 7 containing the bonding agent is pressed between the casting roll 4 and the pressing roll 5 to form a firm bonding region 9, exiting from the rolls as a continuous web.

In a preferred embodiment for this type of production, a mixture of 80 wt.-O/O PU, namely of the type DESMOPANB KU-2 8659 supplied by the company Bayer, and 20 wt.-% maleic anhydride-modified polyolefin of the type EXX-ELORCO VA 1801 supplied by the company Exxon is used. The weight per surface area of the extruded layer is 70 g/m2. The calendered PP nonwoven 1 has a weight per surface area of 100 glm2 and is preheated to 1 10° C. in the preheating system 11. A peeling test after storage of the composite 9 after 24 hours resulted in a delamination in a plane of the PP nonwoven 1, as in the first embodiment.

In each case an actively-breathing composite with sd<0.3 m comes about, manifesting a high robustness and water tightness (WS>1.5) so that the composite is very well suited for utilisation as a roof underlay.

If, for example, a triple-layer composite is to be roduced,—with reference to the embodiment according to FIG. 1—a second nonwoven, coated with a bonding agent, is fed additionally to the location of the casting roll 4 via a correspondingly adapted roll, so that the PU intermediate layer and the two nonwovens made of PP are pressed together to form a firmly bonded composite when passing through the pair of rolls. The embodiment according to FIG. 2 for producing an actively-breathing composite in the form of a web may likewise be adapted to produce such a triple-layer composite, in particular by feeding a second PP nonwoven from the left-hand side. Further modifications may be carried out readily, e.g. by adding further layers, without detailed reference being made thereto.

The invention claimed is:

1. Process for the production of an actively-breathing composite in the form of a web consisting of a nonwoven made of synthetic material and a layer comprising polyurethane (PU) for utilisation as an underlay for roofs and as a façade web, comprising the steps of
heating a product or a layer comprising PU to melting temperature and
extruding the heated product or layer onto a nonwoven consisting of polypropylene (PP) in order to form a diffusion-permeable coating of the PP nonwoven, and
pressing the heated product or layer to the PP nonwoven to form an actively-breathing composite, and further comprising
providing a bonding agent between the product or layer and the nonwoven during the production of the composite, wherein the providing step comprises
applying the bonding agent to the nonwoven in a molten state to provide a bonding agent coated nonwoven such that the extruding step applies the heated product or layer onto the bonding agent coated nonwoven.

2. Process according to claim 1, wherein the PU product is extruded onto the PP nonwoven immediately in the region where the PU layer is pressed to the PP nonwoven.

3. Process according to claim 1, wherein the PP nonwoven is preheated.

4. Process according to claim 3, wherein the bonding agent comprises a reactive, PU-based hot-melt, and wherein the applying step applies the bonding agent onto the PP nonwoven such that it has not cooled down yet when coming into contact with the extruded PU product.

5. Process according to claim 1, wherein the PP nonwoven and the extruded PU product are pressed to one another continuously in the gap between two press rolls.

6. Process according to claim 5, wherein at least one of the two press rolls is heated.

7. Process according to claim 1, wherein the extrusion of the PU product takes place while simultaneously applying the bonding agent to the PP nonwoven.

8. Process according to claim 1, wherein the PU product and the bonding agent are co-extruded during application onto the PP nonwoven.

9. Process according to claim 1, wherein polyurethane is used as the PU product.

10. The process of claim 1, wherein the bonding agent has a different weight per surface area from the heated product or layer comprising PU.

11. The process of claim 1, wherein the bonding agent is applied to the nonwoven upstream of the pressing step.

12. The process of claim 11, wherein the bonding agent has a different weight per surface area from the heated product or layer comprising PU.

13. Process for the production of an actively-breathing composite in the form of a web consisting of a nonwoven made of synthetic material and a layer comprising polyurethane (PU) for utilization as an underlay for roofs and as a façade web, comprising the steps of:
heating a product or a layer comprising PU to melting temperature;
extruding the heated product or layer onto a nonwoven consisting of polypropylene (PP) in order to form a diffusion-permeable coating of the PP nonwoven; and pressing the heated product or layer to the PP nonwoven to form an actively-breathing composite, and further comprising providing a bonding agent between the product or layer and the nonwoven during the production of the composite, wherein the providing step comprises mixing the bonding agent with PU to form a PU bonding agent blend and extruding the PU bonding agent blend onto the nonwoven as the product to form the underlay for roofs or the façade web.

14. Process according to claim 13, wherein the PU bonding agent blend comprises a mixture of PU and maleic anhydride-modified polyolefin, and wherein the PU bonding agent blend is melted and extruded into the region in which pressing between the PU product and the PP nonwoven is performed.

15. Process according to claim 14, wherein the PU bonding agent blend comprises approx. 80 wt. % PU, and approx. 20 wt. % maleic anhydride-modified polyolefin.

\* \* \* \* \*